(12) United States Patent
Kim et al.

(10) Patent No.: US 7,020,886 B2
(45) Date of Patent: Mar. 28, 2006

(54) OPTICAL DISC CHANGER

(75) Inventors: Go-hyun Kim, Gyeonggi-do (KR);
Dong-man Kim, Seoul (KR);
Tae-myun Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 417 days.

(21) Appl. No.: 10/029,984

(22) Filed: Dec. 31, 2001

(65) Prior Publication Data
US 2003/0016595 A1    Jan. 23, 2003

(30) Foreign Application Priority Data
Jul. 23, 2001    (KR) ............... 2001-44201

(51) Int. Cl.
G11B 17/04    (2006.01)
G11B 17/03    (2006.01)
(52) U.S. Cl. .................... 720/711; 369/30.94
(58) Field of Classification Search ............. 369/30.93, 369/30.94, 30.96, 75.2; 720/611
See application file for complete search history.

(56) References Cited
U.S. PATENT DOCUMENTS

| | | | | |
|---|---|---|---|---|
| 5,123,005 A | * | 6/1992 | Kurosu | 369/77.1 |
| 5,204,850 A | * | 4/1993 | Obata | 369/75.2 |
| 6,370,100 B1 | * | 4/2002 | Koshino et al. | 369/77.1 |
| 6,392,975 B1 | * | 5/2002 | Arai | 369/75.1 |
| 6,438,087 B1 | * | 8/2002 | Omori | 369/75.2 |
| 6,490,238 B1 | * | 12/2002 | Begley et al. | 369/75.2 |
| 2002/0186640 A1 | * | 12/2002 | Shimizu et al. | 369/75.2 |

FOREIGN PATENT DOCUMENTS

| | | | | |
|---|---|---|---|---|
| JP | 06309761 A | * | 11/1994 |
| JP | 07272373 A | * | 10/1995 |
| JP | 07272378 A | * | 10/1995 |
| JP | 08077672 A | * | 3/1996 |
| JP | 09198763 A | * | 7/1997 |
| JP | 09282762 A | * | 10/1997 |
| JP | 10199085 A | * | 7/1998 |
| JP | 11213508 A | * | 8/1999 |
| JP | 11345483 A | * | 12/1999 |
| JP | 2000187916 A | * | 7/2000 |
| JP | 2000339809 A | * | 12/2000 |

* cited by examiner

Primary Examiner—William J Klimowicz
(74) Attorney, Agent, or Firm—Staas & Halsey LLP

(57) ABSTRACT

An optical disc changer having a main body, a tray slidably installed in the main body, a roulette rotatably installed at the tray to accommodate a plurality of optical discs, an optical pickup device to selectively reproduce one of the optical discs accommodated on the roulette, and a damping unit to absorb shock when the tray is loaded in and unloaded from the main body to prevent defective reproduction of data from the optical disc.

9 Claims, 5 Drawing Sheets

OPTICAL DISC CHANGER

CROSS-REFERENCE TO RELATED APPLICATIONS

This application claims the benefit of Korean Patent Application No. 2001-44201 filed on Jul. 23, 2001, in the Korean Industrial Property Office, the disclosure of which is incorporated herein by reference.

BACKGROUND OF THE INVENTION

1. Field of the Invention

The present invention relates to an optical disc changer, and more particularly, to an optical disc changer in which the structure of a damping unit to absorb shock when a tray is loaded in or unloaded from a main body is improved.

2. Description of the Related Art

In general, optical disc drives reproduce information recorded on optical discs such as CDs or DVDs which are optical recording media by using optical pickup devices. When an optical disc is placed on a tray and loaded in a drive, a drive unit rotates the optical disc. An optical pickup device mounted at the lower end of the tray reproduces data recorded on the optical disc while being transferred in a radial direction of the optical disc.

Since only one optical disc is accommodated on the tray of the optical disc drive, if a user wishes to reproduce data from a plurality of optical discs, the user must inconveniently repeat operations of ejecting the tray, placing a new optical disc that the user wishes to reproduce data from on the tray, and loading the tray in the disc drive.

To solve the above problems, optical disc changers used to selectively reproduce one of a plurality of optical discs accommodated on a tray, so as not to repeatedly change the optical discs, have been developed.

FIG. 1 illustrates a perspective view of a conventional front loading type optical disc changer to select a desired one of a plurality of optical discs accommodated on a tray and to reproduce the selected optical disc by using an optical pickup device. Referring to FIG. 1, a conventional optical disc changer 100 includes a main body 110, a tray 150 installed to be capable of being inserted into the main body 110, a roulette 160 rotatably installed on the tray 150 and where a plurality of optical discs are accommodated, an optical pickup device 120 to read information from a desired one of the optical discs accommodated on the roulette 160, and a damper support unit 131 installed above the optical pickup device 120 to support a camper 130 which clamps the optical disc against the optical pickup device 120.

In the optical disc changer 100 having the above structure, there is a need to load or unload the tray 150 while one of the optical discs is selected and being reproduced by using the optical pickup device 120. When the tray 150 is unloaded, the optical disc being reproduced by the optical pickup device 120 continues to be reproduced while the remaining optical discs being accommodated on the roulette 160 are unloaded together with the tray 150.

FIG. 2 is a side view of the optical disc changer of FIG. 1. Referring to FIG. 2, a hooking member 151 is formed at both sides of the bottom of the tray 150 in a direction in which the tray is loaded and a hooking protrusion 111 is formed at each of corresponding positions of a main body 110. Thus, when the tray 150 is unloaded from the main body 110, the hooking member 151 is hooked by the hooking protrusion 111 and the tray 150 is refrained from further unloading. Here, as the hooking member 151 is caught by the hooking protrusion 111, the tray 150 receives a shock. Meanwhile, when the tray 150 is completely loaded in the main body 110, the tray 150 bumps against the clamp support member 131 and receives a shock. The shock is delivered to the optical pickup device 120 which reproduces one of the optical discs so that reproduction of the optical disc deteriorates.

Thus, a damper 112 to absorb shock is provided on the clamp support portion 131. Since the damper 112 is formed of rubber, it absorbs shock when the tray being loaded bumps against the clamp support portion 131.

When the tray 150 is unloaded, the hooking portion 151 directly bumps against the hooking protrusion 111, causing shock. However, there is no separate damping means to absorb shock, resulting in a deterioration of the reproduction of data from an optical disc.

SUMMARY OF THE INVENTION

Accordingly, it is an object of the present invention to provide an optical disc changer adopting a damping unit to absorb shock by using a single damping unit when a tray is loaded or unloaded.

Additional objects and advantages of the invention will be set forth in part in the description which follows and, in part, will be obvious from the description, or may be learned by practice of the invention.

The foregoing and other objects of the present invention are achieved by providing an optical disc changer comprising a main body, a tray installed to be capable of sliding in the main body, a roulette rotatably installed at the tray and where a plurality of optical discs are accommodated, an optical pickup device to selectively reproduce one of the optical discs accommodated on the roulette, and a damping unit to absorb shock when the tray is loaded into and unloaded from the main body, so that defective reproduction of the optical disc is prevented.

BRIEF DESCRIPTION OF THE DRAWINGS

These and other objects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
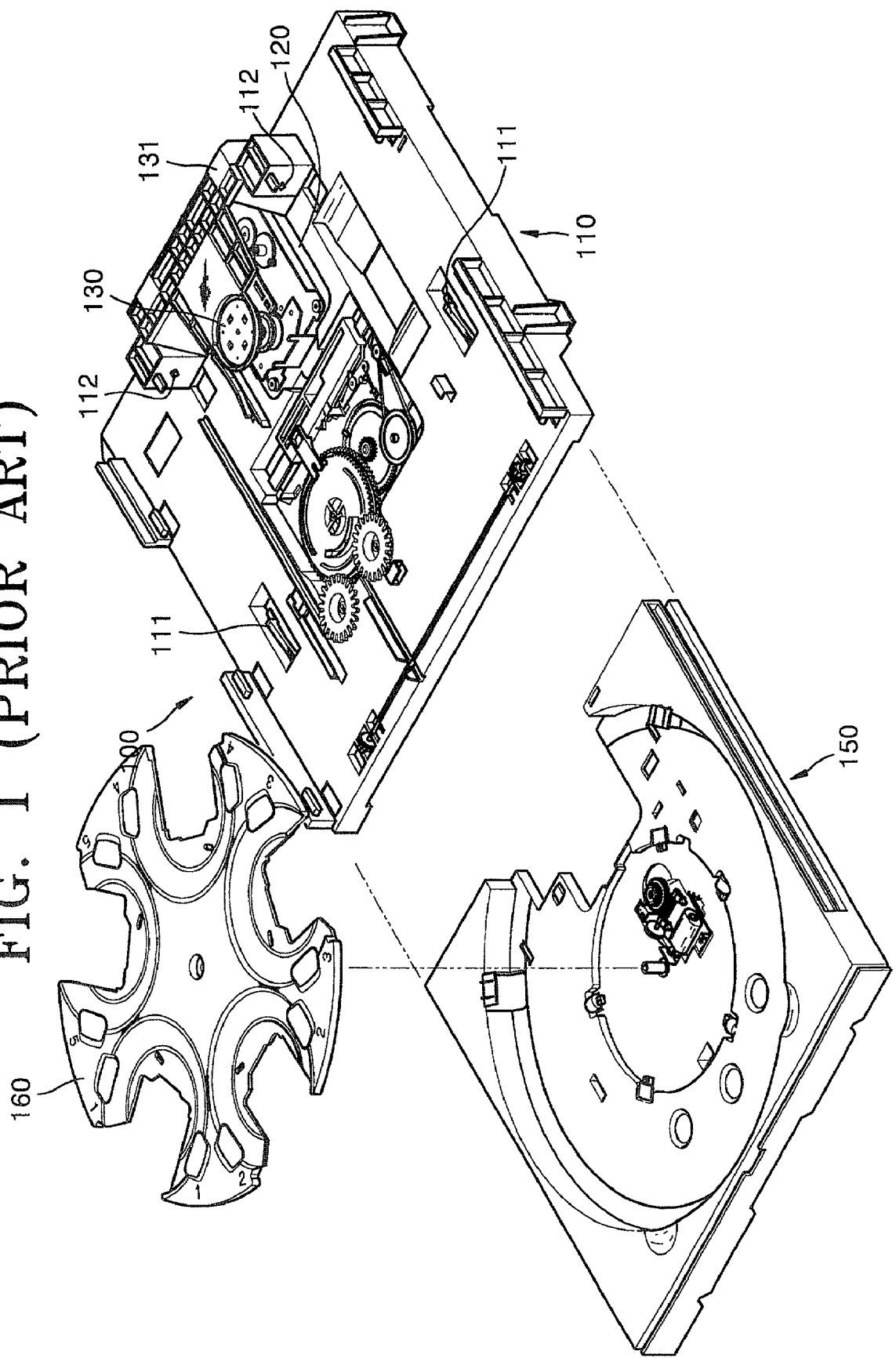
FIG. 1 is a perspective view of a conventional optical disc changer.
Figure 2:
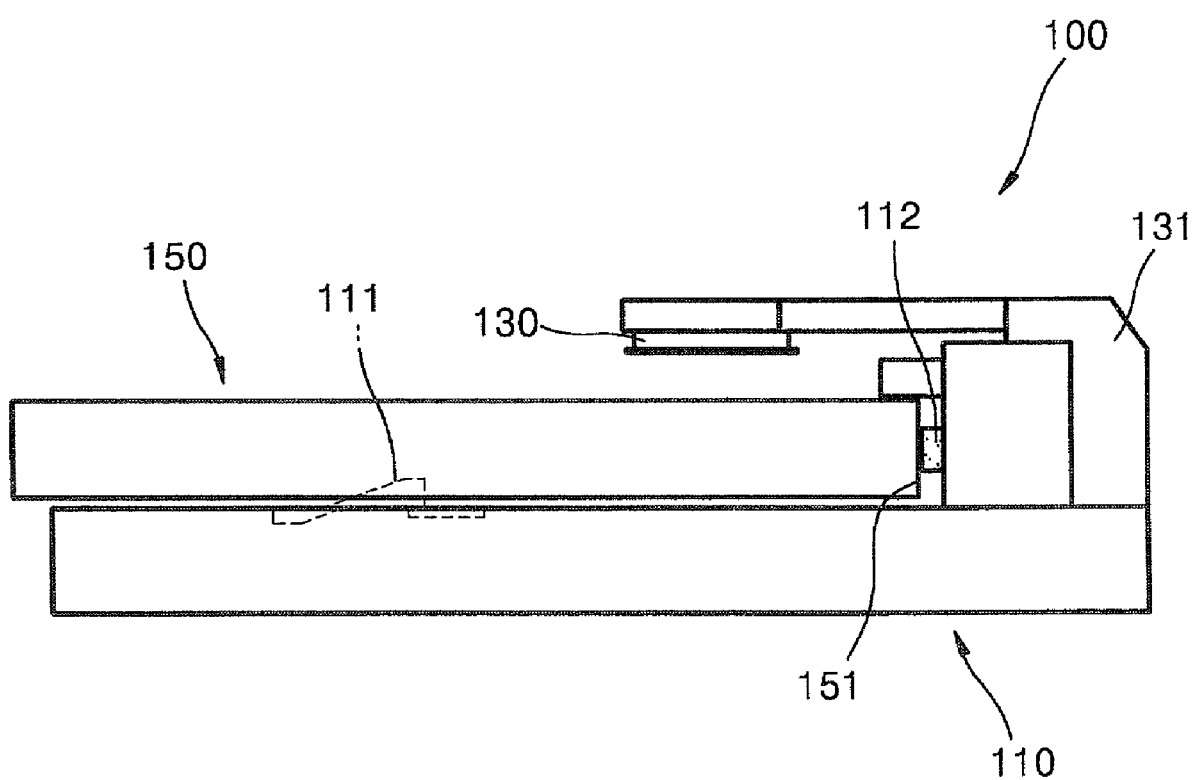
FIG. 2 is a side view of the optical disc changer of FIG. 1.
Figure 3:
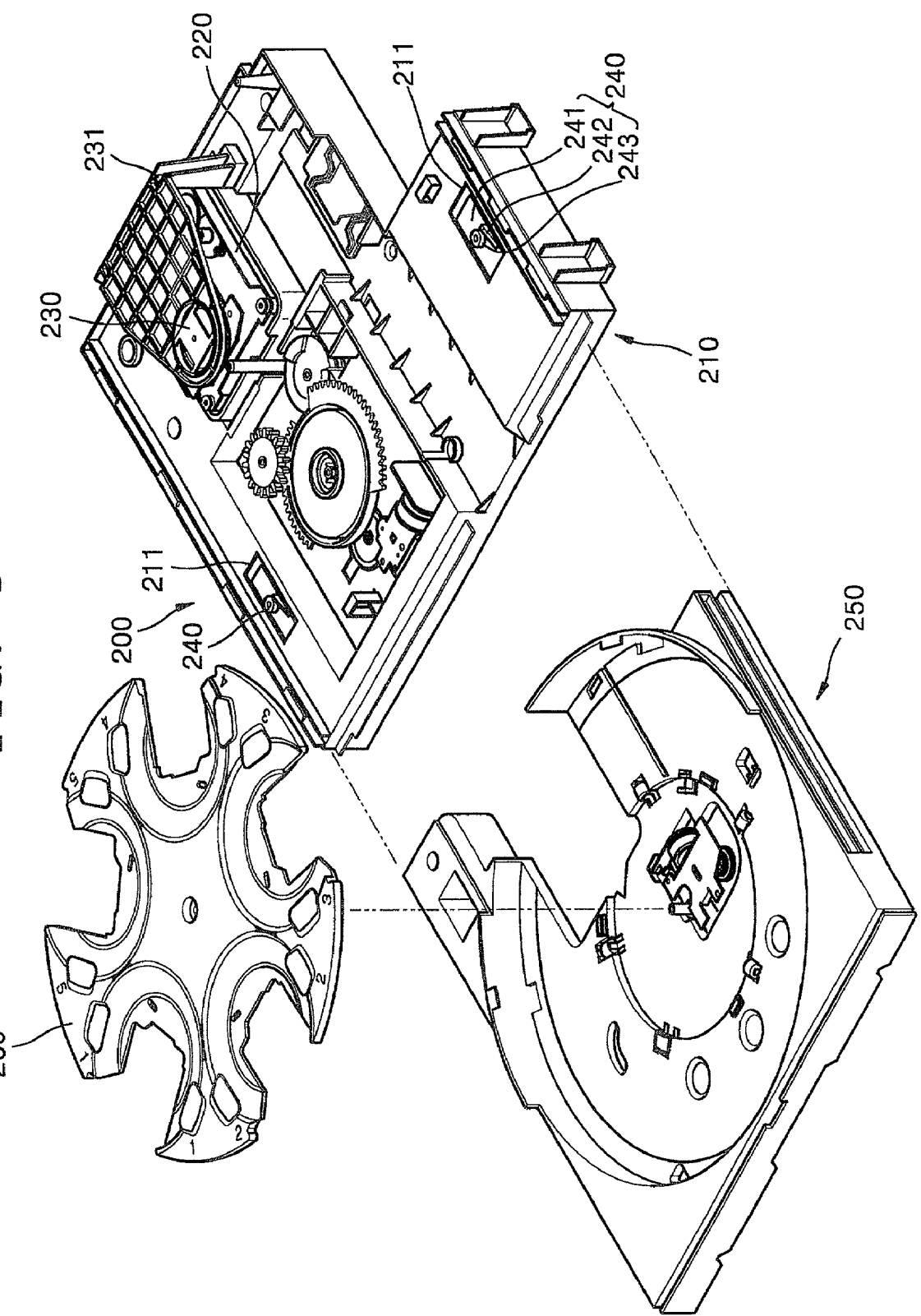
FIG. 3 is a perspective view of an optical disc changer according to the present invention.

Referring to FIG. 3, an optical disc changer 200 according to the present invention includes a main body 210, a tray 250 slidably installed at the main body 210, a roulette 260 rotatably installed at the tray 250 and where a plurality of optical discs are accommodated, an optical pickup device 220 to selectively reproduce one of the optical discs accommodated on the roulette 260, and a clamp support 231 installed above the optical pickup device 220 to support a clamp plate 230 used to clamp the optical disc against the optical pickup device 220. Also, a damping unit 240 is provided to absorb shock when the tray 250 is loaded in or unloaded from the main body 210.

Figure 4:
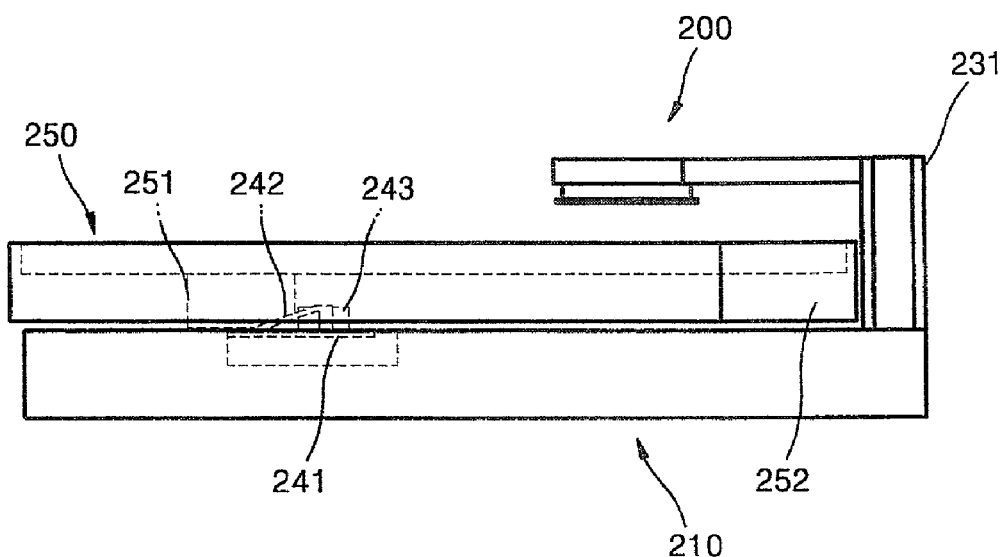
FIG. 4 is a side view of the optical disc changer of FIG. 3.
Figure 5:
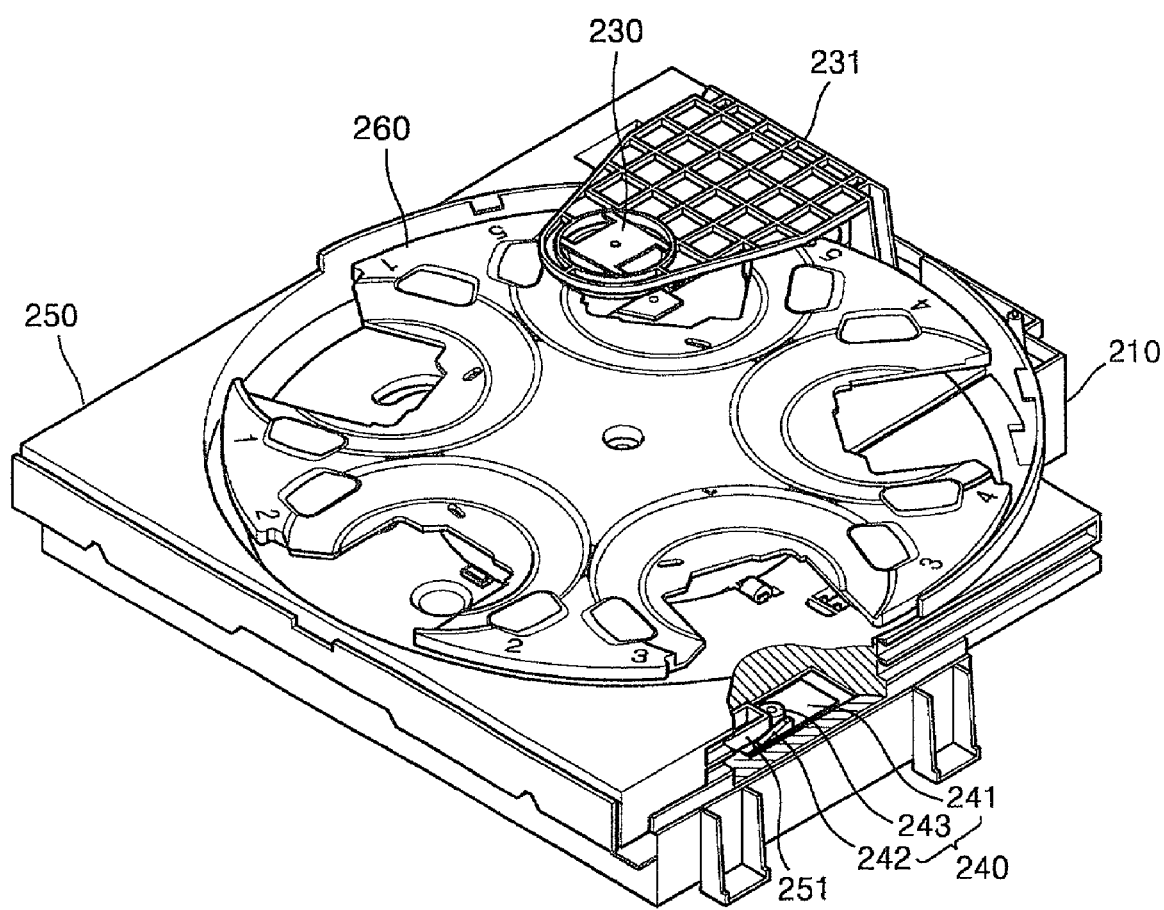
FIG. 5 is a perspective view illustrating the operation of a damping unit when a tray is loaded.
Figure 6:
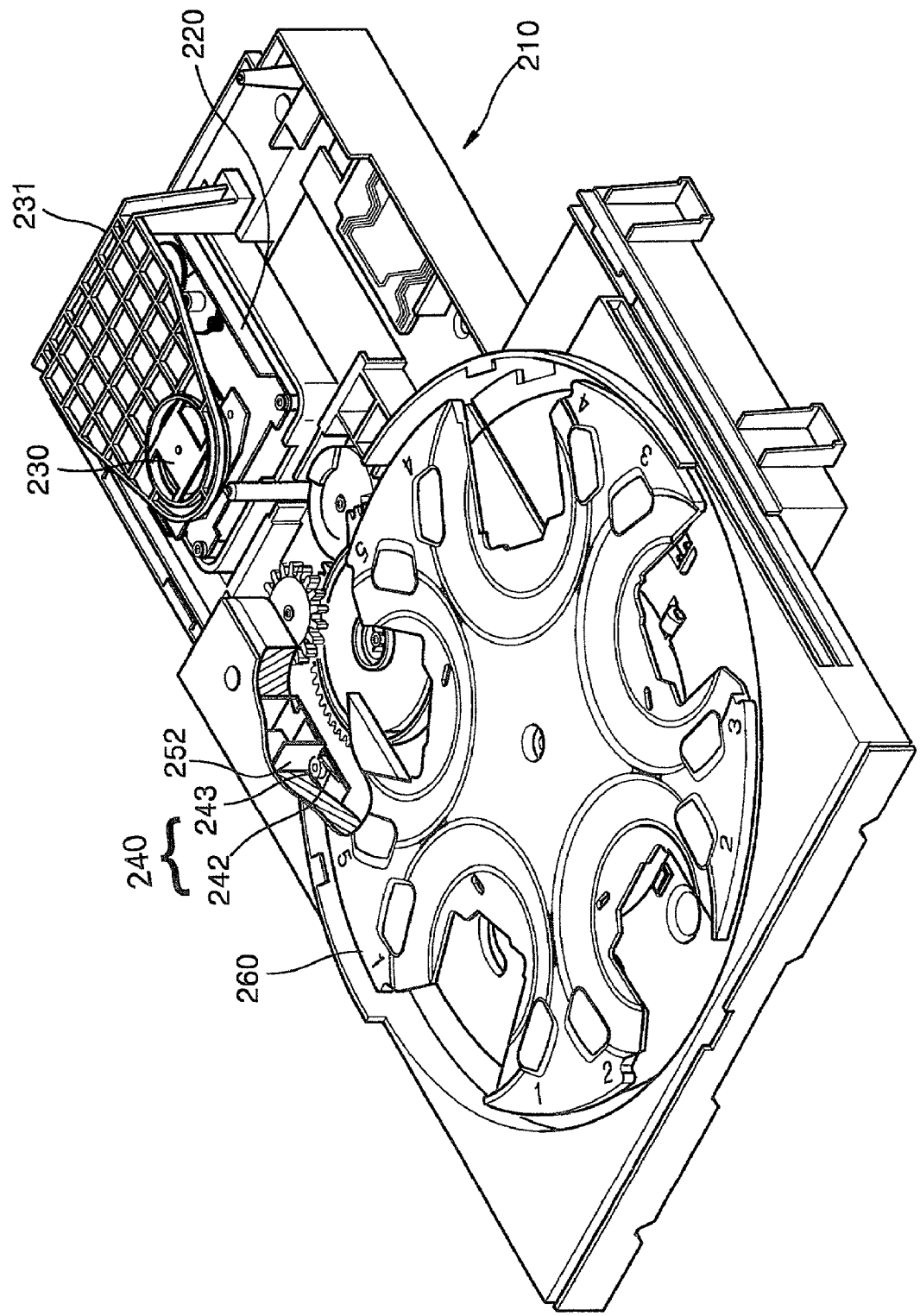
FIG. 6 is a perspective view illustrating the operation of a damping unit when a tray is unloaded.

FIG. 4 is a side view of the optical disc changer shown in FIG. 3. FIG. 5 illustrates the operation of the damping unit 24Q when the tray is loaded. FIG. 6 illustrates the operation of the damping unit 240 when the tray is unloaded.

Referring to FIGS. 4 through 6, the damping unit 240 absorbs shock when the tray 250 is loaded or unloaded and, in particular, when the tray 250 is loaded into or unloaded from the main body 210 while the optical pickup device 220 reproduces data from the optical disc.

The damping apparatus 240 includes a plate 241 formed by being extended from the main body 210, a hooking protrusion 242 and a damper 243 which are provided on the plate 241. Assuming that a portion of the tray 250 unloaded from the main body 210 is a front side portion and a portion of the tray 250 loaded into the main body 210 is a rear side portion, a first stop member 251 is provided at the front side portion of the tray and a second stop member 252 is provided at the rear side portion of the tray.

Each of the first and second stop members 251 and 252 contacts the damper 243 when the tray 250 is loaded or unloaded. The shape of the first and second stop members 251 and 252 can be modified in various ways. Although the first and second stop portions 251 and 252 can be separately manufactured after the tray 250 is formed, an embodiment of the present invention provides that they are formed to be integral with the tray 250 to consider convenience and cost in a manufacturing process.

The first and second stop members 251 and 252 are arranged on the tray 250 at the same interval as a distance the tray 250 moves when it is loaded or unloaded. Thus, when the tray 250 is loaded or unloaded, the damper 243 reciprocates between the first stop member 251 and the second stop member 252.

The plate 241 is extended a predetermined length from one side of a through hole 211 formed at both sides of the main body 210. The plate 241 is formed of plastic and can be elastically moved. That is, when a force is applied to a portion of the plate 241 opposite to a portion connected to a side of the through hole 211, the plate 241 is deformed. When the force is removed, the plate 241 returns to the original position while functioning as an elastic body.

The hooking protrusion 242 provided above the plate 241 prevents the tray 250 from escaping from the main body 210. When the tray 250 is assembled to the main body 210, the plate 241 is deformed downward so that the hooking protrusion 242 is not caught by the second stop portion 252. Then, after assembly, the plate 241 is returned to its original position. When the tray 250 is loaded or unloaded, the first and second stop members 251 and 252 are caught by the hooking protrusion 242, respectively, thus preventing the tray 250 from escaping from the main body 210.

The damper 243 is installed at the plate 241 adjacent to the first and second stop members 251 and 252. An embodiment of the present invention provides that the damper 243 is formed of a rubber capable of absorbing shock. Also, an embodiment of the present invention provides that the damper 243 is disposed to primarily contact the first and second stop members 251 and 252 ahead of the hooking protrusion 242 when the tray 250 is loaded in or unloaded from the main body 210, respectively. This is to absorb shock when the damper 243 bumps the first and second stop members 251 and 252.

In the operation of the damping apparatus having the above structure, when a plurality of optical discs are accommodated on the roulette 260 and the tray 250 is loaded in the main body 210, one of the optical discs to be reproduced is selected and is reproduced by using the optical pickup device 220. When the tray 250 is unloaded during reproduction of the optical disc, the optical disc in reproduction is continuously reproduced and the remaining optical discs on the roulette 260 are unloaded together with the tray 250.

As the tray 250 is unloaded from the main body 210, the second stop member 252 bumps against the damper 243 so that a further unloading is stopped. Here, since the damper 243 absorbs shock when the second stop member 252 bumps against the damper 243, the shock is not delivered to the optical disc in reproduction so that reproduction of the optical disc is not deteriorated.

When the tray 250 is loaded in the main body 210, the first stop member 251 bumps against the damper 243. Since the shock due to bumping is absorbed by the damper 243, the shock is not delivered to the optical disc in reproduction so that reproduction of the optical disc is not deteriorated.

As described above, the damping apparatus of the optical disc changer according to the present invention, when the tray is loaded or unloaded during the reproduction of the optical disc, shock is absorbed when the stop members provided at the tray bump against the damper so that reproduction of the optical disc does not deteriorate.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical disc changer, comprising:
   a main body;
   a tray slidably installed in the main body to accommodate a plurality of optical discs;
   an optical pickup device to reproduce one of the optical discs;
   a stop member and a hook step provided at the tray and the main body, respectively, to prevent the tray from escaping from the main body during unloading; and
   a damper to absorb an impact when the stop member and the hook step bump against each other.

2. The optical disc changer according to claim 1, wherein the damper is disposed between the stop member and the hook step to absorb an impact when the stop member and the hook step bump against each other.

3. The optical disc changer according to claim 2, wherein the damper is installed at the hook step and a shortest portion of the damper protrudes toward the stop member rather than the hook step.

4. The optical disc changer according to claim 3, wherein the damper has a cylindrical shape and is fixedly inserted around a protrusion formed on the tray or the main body.

5. The optical disc changer according to claim 1, wherein the stop member and the hook step approach each other, without a bump, in a direction opposite to a direction for unloading.

6. The optical disc changer according to claim 5, wherein the stop member and/or the hook step retreat when a force is applied in a direction opposite to the direction for unloading and elastically return to an original position when the force is removed.

7. The optical disc changer according to claim 6, wherein an inclination is formed on the stop member or the hook step at a side opposite to a side that bumps during unloading, to move the stop member and the hook step not to bump against each other when approaching each other in a direction opposite to a direction during unloading.

8. The optical disc changer according to claim 7, wherein the stop member and or the hook step is formed on a plate having elasticity and extending from one side of a through hole formed in the tray or the main body.

9. The optical disc changer according to claim 8, wherein the damper is installed on the plate.

\* \* \* \* \*